V. I. AND J. L. ROSS.
LUBRICATOR.
APPLICATION FILED JUNE 7, 1919.
1,317,759.
Patented Oct. 7, 1919.
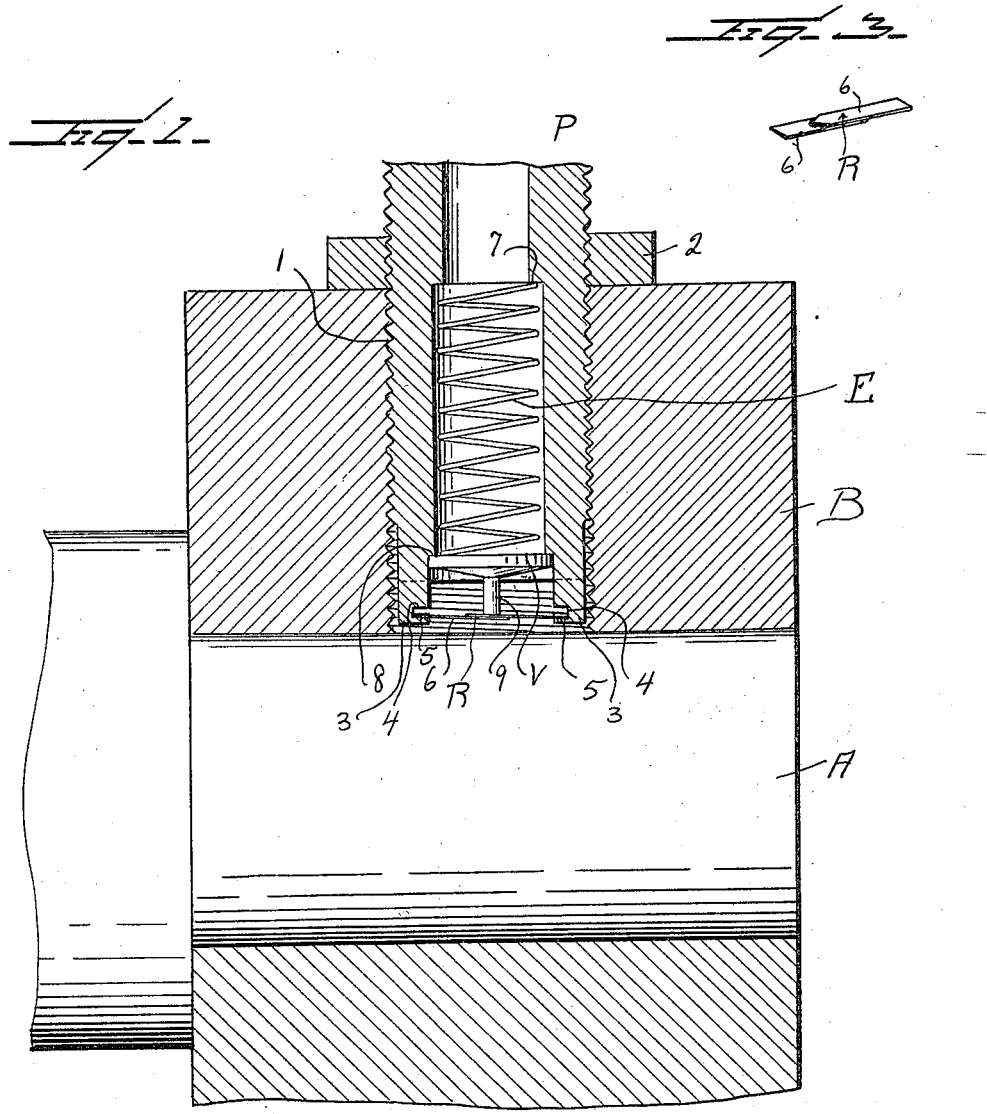
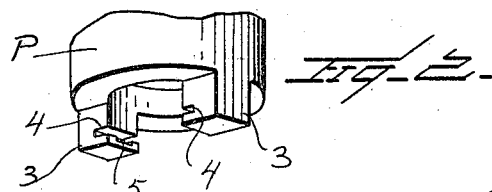
Inventors
V. I. Ross and
J. L. Ross
By Watson E. Coleman
Attorney

UNITED STATES PATENT OFFICE.

VERNON I. ROSS AND JOHN L. ROSS, OF WELLINGTON, OHIO.

LUBRICATOR.

1,317,759.  Specification of Letters Patent.  Patented Oct. 7, 1919.

Application filed June 7, 1919. Serial No. 302,388.

*To all whom it may concern:*

Be it known that we, VERNON I. Ross and JOHN L. Ross, citizens of the United States, residing at Wellington, in the county of Lorain and State of Ohio, have invented certain new and useful Improvements in Lubricators, of which the following is a specification, reference being had to the accompanying drawings.

This invention relates to certain improvements in lubricators and has relation more particularly to a device of this general character especially designed and adapted for use in connection with a rotating member, and it is an object of the invention to provide a lubricator with novel and improved means including a valve normally maintained in closed position by a fusible member so that said valve may assume an open position to permit the feeding of a lubricant in the event the temperature of the rotating member or the bearing or part coacting therewith reaches a materially high degree.

The invention consists in the details of construction and in the combination and arrangement of the several parts of our improved lubricator whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:

Figure 1 is a fragmentary view, partly in section and partly in elevation, illustrating a lubricator constructed in accordance with an embodiment of our invention and in applied position.

Fig. 2 is a view in perspective of the inserting end portion of our improved lubricator as herein disclosed, the resilient member being omitted, and Fig. 3 is a view in perspective of the resilient member herein included.

As disclosed in the accompanying drawings, A denotes a rotatable member, such as a car axle, shaft, or the like, and which is rotatably supported within a bearing B or similar supporting member.

The bearing or member B has disposed therethrough angular to the bore thereof and in communication with said bore an opening 1 in which is threaded an end portion of a pipe or conduit P and which pipe or conduit is held in applied position with respect to said bearing or member B through the instrumentality of a lock nut 2. The pipe or conduit P is in communication with a suitable source of lubricant, preferably oil, and which lubricant is adapted to be discharged by gravity, although the particular feeding of the lubricant forms no part of our present invention.

The inserted end of the pipe or conduit P is provided with a pair of diametrically alined and outstanding lugs 3 having in their opposed faces adjacent their extremities the transversely directed slots 4. The outer side wall of each of the slots 4 is provided with a recess or pocket 5 in which is adapted to seat an end portion of a resilient member R. The resilient member R is initially inserted through the slots 4 at either end thereof and the extremities of said member R seat within the recesses or pockets 5 in a manner which will hereinafter be clearly apparent.

The resilient member R comprises two sections 6 having their inner ends overlapping and secured one to the other by a suitable fusible material which readily melts at the desired degree of temperature.

The pipe or conduit P at a desired distance inwardly of the inserted end thereof is provided with an internal annular shoulder 7 with which engages an end portion of an expansible member E, herein disclosed as a coil spring. The opposite end portion of the spring engages the inner face of a valve member or disk V snugly fitting within the bore of the pipe or conduit P and co-acting with the internal annular valve seat 8 provided at the inserted end of the pipe or conduit P. The central portion of the valve member or disk V is provided with an outstanding lug or finger 9 with which the member R engages for maintaining the valve member or disk V in closed position when said member R has its extremities engaged within the recesses or pockets 5 of the slots 4.

The inserted end of the pipe or conduit P, when applied, terminates in close proximity to the rotating member A, and when the temperature of the member A or bearing B rises to a certain degree, the fusible connection of the sections 6 will separate. When the sections 6 of the member R separate, the expansible member E will force the valve member or disk V into open position, permitting the lubricant to be fed to the member A so that a hot box or other disastrous results are prevented.

From the foregoing description, it is thought to be obvious that a lubricator constructed in accordance with my invention is well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed:

We claim:

1. A lubricator comprising a conduit for delivering lubricant, the discharging end of the conduit being provided with a pair of diametrically alined lugs, a valve member for closing the discharge end of the conduit, means for constantly urging the valve member downwardly when in closed position, and a fusible member connecting the lugs and contacting with the valve member for holding the same in closed position.

2. A lubricator comprising a conduit for delivering lubricant, the discharging end of the conduit being provided with a pair of substantially diametrically alined lugs, the opposed spaces of said lugs being provided with transversely directed slots, a side wall of each of the slots being provided with a recess, a valve member for closing the discharge end of the conduit, and a fusible member connecting the lugs and seating within the recesses of the slots, said fusible member contacting with the valve member for holding the same in closed position.

In testimony whereof we hereunto affix our signatures in the presence of two witnesses.

VERNON I. ROSS,
J. L. ROSS.

Witnesses:
C. B. CANES,
LEECH A. GROVE.

Copies of this patent may be obtained for five cents each, by addressing the "Commissioner of Patents, Washington, D. C."